(12) United States Patent
Givargis

(10) Patent No.: US 8,612,402 B1
(45) Date of Patent: Dec. 17, 2013

(54) SYSTEMS AND METHODS FOR MANAGING KEY-VALUE STORES

(71) Applicant: STEC, Inc., Santa Ana, CA (US)

(72) Inventor: Tony Givargis, Irvine, CA (US)

(73) Assignee: STEC, Inc., Santa Ana, CA (US)

( * ) Notice: Subject to any disclaimer, the term of this patent is extended or adjusted under 35 U.S.C. 154(b) by 0 days.

(21) Appl. No.: 13/662,200

(22) Filed: Oct. 26, 2012

(51) Int. Cl.
*G06F 3/00* (2006.01)

(52) U.S. Cl.
USPC ........................................................ 707/693

(58) Field of Classification Search
USPC ........ 707/693, 700, 797; 711/207, 1; 382/240
See application file for complete search history.

(56) References Cited

U.S. PATENT DOCUMENTS

| | | | | |
|---|---|---|---|---|
| 4,847,619 A | * | 7/1989 | Kato et al. | 341/106 |
| 5,953,017 A | * | 9/1999 | Beach et al. | 345/440 |
| 6,144,773 A | * | 11/2000 | Kolarov et al. | 382/240 |
| 6,208,993 B1 | | 3/2001 | Shadmon | |
| 6,215,907 B1 | * | 4/2001 | Kumar et al. | 382/240 |
| 6,646,573 B1 | * | 11/2003 | Kushler et al. | 341/28 |
| 6,654,760 B2 | | 11/2003 | Baskins et al. | |
| 6,782,382 B2 | | 8/2004 | Lunteren | |
| 6,892,207 B2 | | 5/2005 | McKay et al. | |
| 7,424,600 B2 | * | 9/2008 | Yamamoto | 712/300 |
| 7,548,928 B1 | | 6/2009 | Dean et al. | |
| 7,647,291 B2 | | 1/2010 | Mosescu | |
| 8,121,987 B2 | | 2/2012 | Cha et al. | |
| 8,255,398 B2 | | 8/2012 | Bhattacharjee et al. | |
| 2002/0035660 A1 | * | 3/2002 | Tikkanen et al. | 711/1 |
| 2003/0135495 A1 | | 7/2003 | Vagnozzi | |
| 2004/0006626 A1 | * | 1/2004 | Inagaki | 709/227 |
| 2005/0246362 A1 | * | 11/2005 | Borland | 707/101 |
| 2008/0243881 A1 | | 10/2008 | Russo | |
| 2009/0055422 A1 | * | 2/2009 | Williams et al. | 707/101 |
| 2011/0022819 A1 | * | 1/2011 | Post et al. | 711/207 |
| 2011/0208703 A1 | * | 8/2011 | Fisher et al. | 707/692 |
| 2011/0246503 A1 | | 10/2011 | Bender et al. | |
| 2011/0320496 A1 | | 12/2011 | Reid et al. | |
| 2012/0047181 A1 | * | 2/2012 | Baudel | 707/797 |
| 2012/0221576 A1 | * | 8/2012 | Marquardt et al. | 707/741 |
| 2012/0271862 A1 | | 10/2012 | Kulkarni et al. | |

OTHER PUBLICATIONS

Lim et al. "SILT: A Memory-Efficient, High-Performance Key-Value Store." *Proceedings of the 23rd ACM Symposium on Operating Systems Principles (SOSP'11)*. Oct. 23-26, 2011. Cascais, Portugal. 13 pages.

* cited by examiner

*Primary Examiner* — Hung T Vy
(74) *Attorney, Agent, or Firm* — Wilmer Cutler Pickering Hale and Dorr LLP

(57) ABSTRACT

Systems and methods for managing key-value stores are disclosed. In some embodiments, the systems and methods may be realized as a method for managing a key-value store including creating an uncompressed tree of key-value pairs, monitoring the growth of the uncompressed tree, compressing the uncompressed tree when the uncompressed tree meets and/or exceeds a specified threshold, and creating a new empty uncompressed tree.

20 Claims, 6 Drawing Sheets

SYSTEMS AND METHODS FOR MANAGING KEY-VALUE STORES

BACKGROUND

A key-value store is a data organization system where each "value" to be stored is associated with a unique "key." The basic operations of a key-value store are insert and lookup commands. An insert command is issued to store the key-value pairs on the storage device. A lookup command is issued to retrieve the value associated with a specified key, if the key and value exist. A key-value system must be able to insert and look up key-value pairs in a time-efficient manner. Ideally, key-value pairs are stored and maintained in sorted order by key on the storage device. Algorithmically, inserting and looking up keys within a sorted sequence is substantially faster in time than performing the same operations on an unsorted sequence. In order to maintain a sequence of key-value pairs in sorted order, it is necessary to reorganize the existing data when new key-value pairs are being inserted.

However, as the size of key-value stores increase the maintaining efficiency of looking up a key and inserting a key becomes more challenging to maintain.

Caching may be used to store key-value stores for increased performance of a key-value store. Caching is the temporary storage of data for subsequent retrieval. Memory devices are often used to store data provided by a computer program. Examples of memory storage devices include, but are not limited to, solid-state drives, hard disk drives, and optical drives. These types of storage devices are inexpensive and hold large amounts of data. However, one tradeoff for their economic value is that they are slow compared to other components used in a computer. For example, a consumer hard drive can store terabytes of data cheaply, but has a maximum theoretical transfer rate of 300 megabytes (MB) per second. Random access memory (RAM) is faster in performance but higher in price, with a maximum theoretical transfer rate of 12.8 gigabytes (GB) per second. A central processing unit (CPU) with specialized memory known as level 1 (L1) cache or level 2 (L2) cache has even better performance but at an even higher price, with a transfer rate of 16 GB per second, or over fifty times faster than the storage device.

A technique known as caching may be used to increase, or accelerate, overall system performance. Caching may be used to store data requested from one component, into another component, to speed future requests for the same data. The data stored in a cache often may be values previously requested by a software application, by an operating system, or by another hardware component. Caching organizes a small amount of fast-access memory and a large amount of slow-access memory. The first time that a value is requested, the data is not in the cache, so the requested value is retrieved from the slow-access memory. In a cache, when the value is retrieved from the slow-access memory, the value is sent to the component that requested it, and the value also is stored in the fast-access memory for future requests. The next time that the same value is requested by the operating system or by any other program, the value is retrieved from the fast-access memory, with the result that the overall system performance is faster, or accelerated, by virtue of the value being available from the fast-access memory. By using faster memory components to cache data, more requests can be served from the cache instead of the slower storage device, and faster overall system performance is realized.

Key-value stores may be used to support fast retrieval and insertion of values to support numerous applications. Key-value stores may be implemented on numerous storage platforms which may or may not include cached platforms.

SUMMARY OF THE DISCLOSURE

Systems and methods for managing key-value stores are disclosed. In some embodiments, the systems and methods may be realized as a method for managing a key-value store including creating an uncompressed tree of key-value pairs, monitoring the growth of the uncompressed tree, compressing the uncompressed tree when the uncompressed tree meets and/or exceeds a specified threshold, and creating a new empty uncompressed tree.

Compression of an uncompressed tree may occur in response to one or more factors. For example, an uncompressed tree may be compressed based on a percentage of used space in a uncompressed tree, a number of keys in a uncompressed tree, an amount of storage used by an uncompressed tree, a percentage of storage used by an uncompressed tree, a percentage of memory used by an uncompressed tree, an amount of memory used by an uncompressed tree, a percentage of cache used by an uncompressed tree, an amount of cache used by an uncompressed tree, a key retrieval performance metric, a key insertion performance metric, a key deletion performance metric, a range query performance metric, a current load on a processor, a current I/O load on a cache, a current disk I/O load, a current network I/O load, or other metrics specified by a user. Compression may be performed using one or more algorithms.

In accordance with further aspects of this exemplary embodiment, the systems and methods for managing a key-value store may include maintaining a list of an uncompressed tree and one or more compressed trees and searching one or more trees in the list to identify a key. In accordance with additional aspects of this exemplary embodiment, the systems and methods for managing a key-value store may include receiving a request to insert new key-value data, searching one or more key-value trees and determining whether the key exists in an existing tree. In the event that the key is identified in a tree, the data at an identified offset associated with the identified key may be updated with the new value. In the event that the key is not identified in a tree, a new key-value pair may be inserted in an uncompressed tree.

In accordance with additional aspects of this exemplary embodiment, the systems and methods may further include receiving a request to delete a key-value pair from a tree. The key-value pair may be located via a search of one or more trees. In the event that the key-value pair is located in an uncompressed tree, the key-value pair may be deleted. In the event that the key-value pair is located in a compressed tree, the key value pair may be marked for deletion. In accordance with further aspects of this exemplary embodiment, an amount, a percentage, or another measure of deleted keys in a compressed tree may be measured. If a percentage of a compressed tree used by deleted keys meets or exceeds a specified threshold, reclamation of the space holding the deleted keys may be performed. Key-value pairs which have not been deleted but which are in a compressed tree holding more than a specified percentage of deleted keys may be copied to an uncompressed tree. The compressed tree may then be deleted. Reclamation of unused space and deletion of keys may be initiated by one or more events. A delete request may trigger an evaluation of space allocated to deleted keys in a particular tree, an evaluation of available storage, an evaluation of an amount of tree and/or key-value data loaded into memory, an evaluation of available memory, an evaluation of an amount of tree and/or key-value data loaded into cache, a comparison of a current processing and/or cache load versus an estimated reclamation time or load, and/or an evaluation of one or more performance metrics. Deletion and/or reclamation of space may also be performed at other times (e.g., periodic intervals such as nightly or during off-peak hours, or in response to an administrator command).

Deletion and/or reclamation of space may occur in response to one or more factors. For example, space in a compressed tree having keys marked as deleted may be reclaimed based on a percentage of unused space in a compressed tree, a number of deleted keys in a compressed tree, an amount of storage used by a compressed tree, a percentage of storage used by a compressed tree, an amount of memory used by a compressed tree, a percentage of memory used by a compressed tree, a percentage of cache used by a compressed tree, an amount of cache used by a compressed tree, a key retrieval performance metric, a key deletion performance metric, a range query performance metric, a current load on a processor, a current network I/O load, a current amount of available memory, a current cache I/O load, a current disk I/O load, or other metrics specified by a user.

In accordance with additional aspects of this exemplary embodiment, the systems and methods may further include receive a range query. The range query may be processed to retrieve one or more keys in a specified range by traversing a tree structure to identify the one or more keys between two specified keys marking the boundaries of the range.

In accordance, with one or more embodiments, the trees used to hold key-value pairs may comprise prefix trees, tries, and/or an ordered tree data structure. Maintaining a number of compressed tries with short keys may facilitate fast retrieval. Maintaining a single uncompressed tree may facilitate fast insertion. Periodically compressing an uncompressed tree based on one or more metrics and/or thresholds may prevent an unchecked growth of an uncompressed tree and degradation of performance. Marking keys in a compressed tree as deleted without requiring a rebuilding of the compressed tree may avoid a performance hit. Space may be reclaimed as discussed above during off-peak hours by migrating keys which have not been deleted to an uncompressed tree and deleting the compressed tree.

According to some embodiments, a list or other data structure of one or more data trees may be maintained. For example, a linked list may refer to a plurality of data trees. A first item in a linked list may be a reference to an uncompressed tree. Other items in the linked list may include one or more references to compressed trees. References to trees in a list may be inserted as trees are created. References to trees may be reordered according to one or more factors. For example, metrics may be maintained of trees containing the most frequently requested key-value pairs, least frequently requested key-value pairs, most frequently updated key-value pairs, trees having a highest percentage of deleted keys, trees having a lowest percentage of deleted keys, or other factors. A tree having produced a higher number of hits or a higher percentage of hits to misses than another tree may be listed earlier in a list or data structure, which may cause it to be traversed earlier in a search for a key.

According to some embodiments, a list, linked list, or other data structure containing references to trees may be maintained in memory of a server or host device (e.g., in DRAM). A list, linked list or other data structure may reference trees by an offset indicating a location in storage or a file of the tree. For example, a linked list in memory may contain an offset indicating a starting position of a tree. The offset may be a location in a file. The file may be located on disk, in a cache device (e.g., a SSD), or other electronic storage. According to some embodiments, a list, a linked list, or other data structure containing references to trees may refer to trees on multiple storage devices. For example, a linked list may refer to a plurality of trees on a first SSD, a plurality of trees on a second SSD, a plurality of trees across several SSDs associated with a host, one or more trees on SSDs and one or more trees on disk, or other arrangements of cache devices and storage. In some embodiments, one or more trees may be loaded in part or entirely into memory.

In accordance with further aspects of this exemplary embodiment, the host device may comprise at least one of: an enterprise server, a database server, a workstation, a computer, a mobile phone, a game device, a personal digital assistant (PDA), an email/text messaging device, a digital camera, a digital media (e.g., MP3) player, a GPS navigation device, and a TV system.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DESCRIPTION

The present disclosure relates to management of key-value stores. Management of key-value stores may include creating an uncompressed tree of key-value pairs, monitoring the growth of the uncompressed tree, compressing the uncompressed tree when the uncompressed tree meets and/or exceeds a specified threshold, and creating a new empty uncompressed tree.

Managing a key-value store may include maintaining a list of an uncompressed tree and one or more compressed trees and searching one or more trees in the list to identify a key.

The systems and methods for managing a key-value store may include receiving a request to insert new key-value data, searching one or more key-value trees and determining whether the key exists in an existing tree. In the event that the key is identified in a tree, the data at an identified offset may be updated with the new value. In the event that the key is not identified in a tree, a new key-value pair may be inserted in an uncompressed tree. Key-value store management systems and methods are discussed in further detail below.

Figure 1:
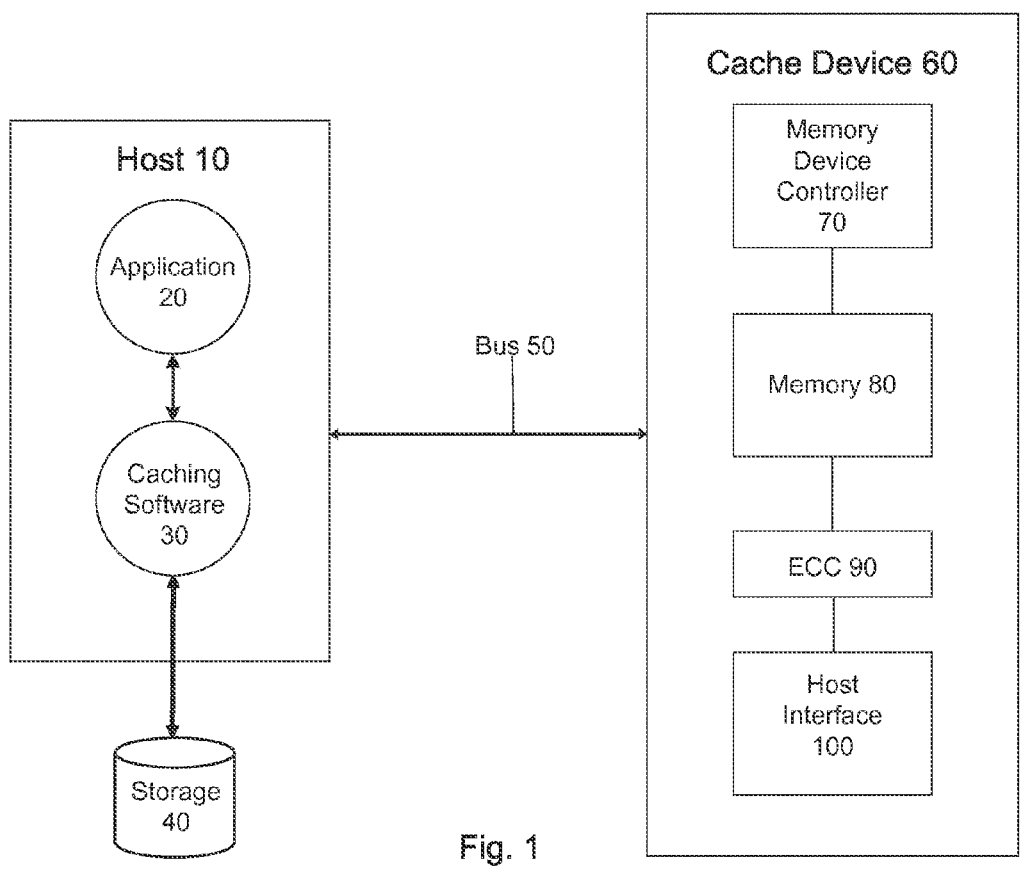
FIG. 1 shows an exemplary block diagram depicting a solid state device in communication with a host device, in accordance with an embodiment of the present disclosure.

Turning now to the drawings, FIG. 1 is an exemplary block diagram depicting a solid state device in communication with a host device, in accordance with an embodiment of the present disclosure. FIG. 1 includes a number of computing technologies such as a host 10, application 20, caching software 30, a bus 50, a cache device 60, a memory device controller 70, a memory 80, an Error Correcting Code (ECC) memory block 90, and a host interface 100. The bus 50 may use suitable interfaces standard including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), Universal Flash Storage (UFS) and Peripheral Component Interconnect Express (PCIe).

As used herein, the phrase "in communication with" means in direct communication with or in indirect communication with via one or more components named or unnamed herein (e.g., a memory card reader). The host 10 and the cache device 60 can be in communication with each other via a wired or wireless connection and may be local to or remote from one another. According to some embodiments, the cache device 60 can include pins (or a socket) to mate with a corresponding socket (or pins) on the host 10 to establish an electrical and physical connection. According to one or more other embodiments, the cache device 60 includes a wireless transceiver to place the host 10 and cache device 60 in wireless communication with each other.

The host 10 can take any suitable form, such as, but not limited to, an enterprise server, a database host, a workstation, a personal computer, a mobile phone, a game device, a personal digital assistant (PDA), an email/text messaging device, a digital camera, a digital media (e.g., MP3) player, a GPS navigation device, and a TV system. The cache device 60 can also take any suitable form, such as, but not limited to, a universal serial bus (USB) device, a memory card (e.g., an SD card), a hard disk drive (HDD), a solid state device (SSD), and a redundant array of independent disks (RAID). Also, instead of the host device 10 and the cache device 60 being separately housed from each other, such as when the host 10 is an enterprise server and the cache device 60 is an external card, the host 10 and the cache device 60 can be contained in the same housing, such as when the host 10 is a notebook computer and the cache device 60 is a hard disk drive (HDD) or solid-state device (SSD) internal to the housing of the computer.

As shown in FIG. 1, the host 10 can include application 20 and caching software 30. According to some embodiments, a key-value store may be implemented on host 10 (e.g., in memory and/or on storage 40) and caching software 30 and cache device 60 may not be present or utilized. In one or more embodiments, caching software 30 and/or cache device 60 may be utilized to improve performance of a key-value store (e.g., by caching frequently requested data referenced by a key-value store). In general, application 20 may reside on host 10 or remote from host 10. Application 20 may request data from caching software 30. Caching software 30 may be configured to send input/output (I/O) requests to cache device 60 via the bus 50. Caching software 30 may direct input/output (I/O) requests for data not stored on cache device 60 to storage 40. The memory 80 stores data for use by the host 10. The cache device 60 contains a host interface 100, which is configured to receive commands from and send acknowledgments to the host 10 using the interface standard appropriate for the bus 50. The cache device 60 may also contain a memory device controller 70 operative to control various operations of the cache device 60, an optional Error Correcting Code (ECC) memory block 90 to perform ECC operations, and the memory 80 itself.

The memory 80 can take any suitable form, such as, but not limited to, a solid-state memory (e.g., flash memory, or solid state device (SSD)), optical memory, and magnetic memory. While the memory 80 is preferably non-volatile, a volatile memory also can be used. Also, the memory 80 can be one-time programmable, few-time programmable, or many-time programmable. In one embodiment, the memory 80 takes the form of a raw NAND die; however, a raw NOR die or other form of solid state memory can be used.

The host 10 and the cache device 60 can include additional components, which are not shown in FIG. 1 to simplify the drawing. Also, in some embodiments, not all of the components shown are present. Further, the various controllers, blocks, and interfaces can be implemented in any suitable fashion. For example, a controller can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example.

Storage 40 may utilize a redundant array of inexpensive disks ("RAID"), magnetic tape, disk, Direct-attached storage (DAS), a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage.

Caching software 30 may receive I/O requests from application 20 and may forward requests for cached data to cache device 60 and may return retrieved data. Caching software 30 may forward I/O requests for uncached data to storage 40 and may return retrieved data. According to some embodiments, caching software 30 may implement one or more caching algorithms to improve cache performance. For example, caching software 30 may implement one or more of a Least Recently Used (LRU) algorithm, a Least Frequently Used (LFU) algorithm, a Most Recently Used algorithm, or another caching algorithm.

According to some embodiments, caching software 30, another application or component of host 10 or an application or component of cache device 60 may implement one or more key-value store management systems and methods. According to one or more embodiments, a linked list, a list, or another data structure referring to one or more trees of key-value pairs may be contained in memory of Host 10 (e.g., SDRAM (Synchronous Dynamic Random Access Memory)). The trees used to hold key-value pairs may comprise prefix trees, tries, and/or an ordered tree data structure. Trees may offer advantages in the speed of queries, range-queries, inserts, deletions, and other operations. The list or other data structure may contain offsets referring to an uncompressed tree and one or more compressed trees stored in memory 80 of cache device 60. An uncompressed tree may be used for insertions, which may provide performance advantages. One or more compressed trees may be used to store a number of key-value pairs and may provide query performance advantages. Trees may be comprised of a root node, one or more internal nodes, and one or more leaf nodes. A node may be a record which may be linked to one or more additional records (nodes). The nodes may contain a key and a value. As discussed in further detail in reference to FIGS. 2-6 below, caching software 30 or another component may provide functionality to manage one or more trees of key-value stores.

Figure 2:
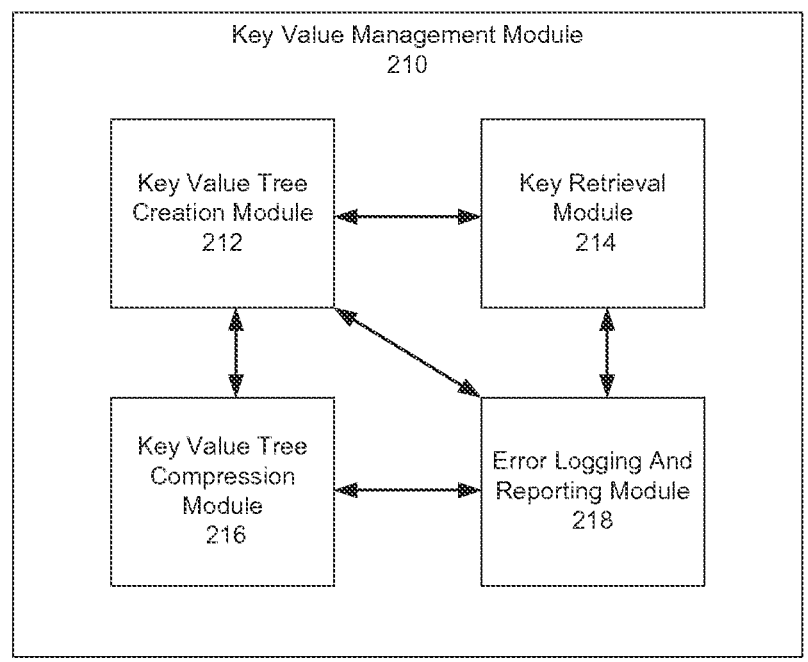
FIG. 2 depicts an exemplary module for managing key-value stores, in accordance with an embodiment of the present disclosure.

FIG. 2 depicts an exemplary module for managing key-value stores, in accordance with an embodiment of the present disclosure. As illustrated in FIG. 2, key-value management module 210 may contain key-value tree creation module 212, key retrieval module 214, key-value tree compression module 216, and error logging and reporting module 218. One or more modules of FIG. 2 may be implemented on Host 10 of FIG. 1, on Cache Device 60 of FIG. 1, on a combination of Host 10 and Cache Device 60, or on another device (e.g., a separate server, storage, or cache device communicatively coupled to host 10).

Key-value tree creation module 212 may create or more key-value trees. Key-value tree creation module 212 may create an uncompressed tree. The trees used to hold key-value pairs may comprise prefix trees, tries, and/or an ordered tree data structure. Key-value tree creation module 212 may insert new key-value data. In the event that the key is identified in a tree, the data at an identified offset may be updated with the new value. In the event that the key is not identified in a tree, a new key-value pair may be inserted in an uncompressed tree.

Key-value tree creation module 212 may create and maintain a list of an uncompressed tree and one or more compressed trees. The list or other data structure of one or more data trees may be, for example, a linked list that refers to a plurality of key-value trees. A first item in a linked list may be a reference to an uncompressed tree. Other items in the linked list may include one or more references to compressed trees. References to trees in a list may be inserted as trees are created. Key-value tree creation module 212 may reorder references to key-value trees according to one or more factors. For example, metrics may be maintained of trees containing the most frequently requested key-value pairs, least frequently requested key-value pairs, most frequently updated key-value pairs, trees having a highest percentage of deleted keys, trees having a lowest percentage of deleted keys, or other factors. A tree having produced a higher number of hits to misses than another tree may be listed earlier in a list or data structure, which may cause that tree to be traversed earlier in a search for a key.

Key retrieval module 214 may search one or more trees in a list to identify a key. Key retrieval module 214 may start with an ordered list, a linked list, or another data structure containing a reference to one or more key-value trees. Key retrieval module 214 may traverse a list to obtain an offset of each tree in order. Key retrieval module 214 may traverse a tree to identify a key-value pair based on the provided key.

Key retrieval module 214 may receive and search using a range query. The range query may be processed to retrieve one or more keys in a specified range by traversing a tree structure to identify the one or more keys in one or more trees between two specified keys marking the boundaries of the range.

Key-value tree compression module 216 may monitor growth of an uncompressed tree. Key-value tree compression module 216 may compress an uncompressed tree when the uncompressed tree meets and/or exceeds a specified threshold, and creating a new empty uncompressed tree. Compression may affect an amount of data stored in a leaf node of a tree.

Compression of an uncompressed tree may occur in response to one or more factors. For example, an uncompressed tree may be compressed based on a percentage of used space in a uncompressed tree, a number of keys in a uncompressed tree, an amount of storage used by an uncompressed tree, a percentage of storage used by an uncompressed tree, a percentage of memory used by an uncompressed tree, an amount of memory used by an uncompressed tree, a percentage of cache used by an uncompressed tree, an amount of cache used by an uncompressed tree, a key retrieval performance metric, a key insertion performance metric, a key deletion performance metric, a range query performance metric, a current load on a processor, a current I/O load on a cache, a current disk I/O load, a current network I/O load, or other metrics specified by a user.

Key-value tree compression module 216 may further handle deletion of keys. Key-value tree compression module 216 may receive a request to delete a key-value pair from a tree. The key-value pair may be located via a search of one or more trees. In the event that the key-value pair is located in an uncompressed tree, the key-value pair may be deleted. In the event that the key-value pair is located in a compressed tree, the key value pair may be marked for deletion. An amount, a percentage, or another measure of deleted keys in a compressed tree may be measured by key-value tree compression module 216. If a percentage of a compressed tree used by deleted keys meets or exceeds a specified threshold (e.g., fifty percent), reclamation of the space holding the deleted keys may be performed by key-value tree compression module 216. Key-value pairs which have not been deleted but which are in a compressed tree holding more than a specified percentage of deleted keys may be copied to an uncompressed tree. The compressed tree may then be deleted.

Reclamation of unused space and deletion of keys may be initiated by one or more events. A delete request may trigger an evaluation of space allocated to deleted keys in a particular tree, an evaluation of available storage, an evaluation of an amount of tree and/or key-value data loaded into memory, an evaluation of available memory, an evaluation of available cache space, a comparison of a current processing and/or cache load versus an estimated reclamation time or load, and/or an evaluation of one or more performance metrics. Deletion and/or reclamation of space may also be performed at other times (e.g., periodic intervals such as nightly or during off-peak hours, or in response to an administrator command).

Error logging and reporting module 218 may handle errors occurring during the management of key-value stores. For example, error logging and reporting module 218 handle collisions, corruption of keys, corruption of data trees, or other errors.

Figure 3:
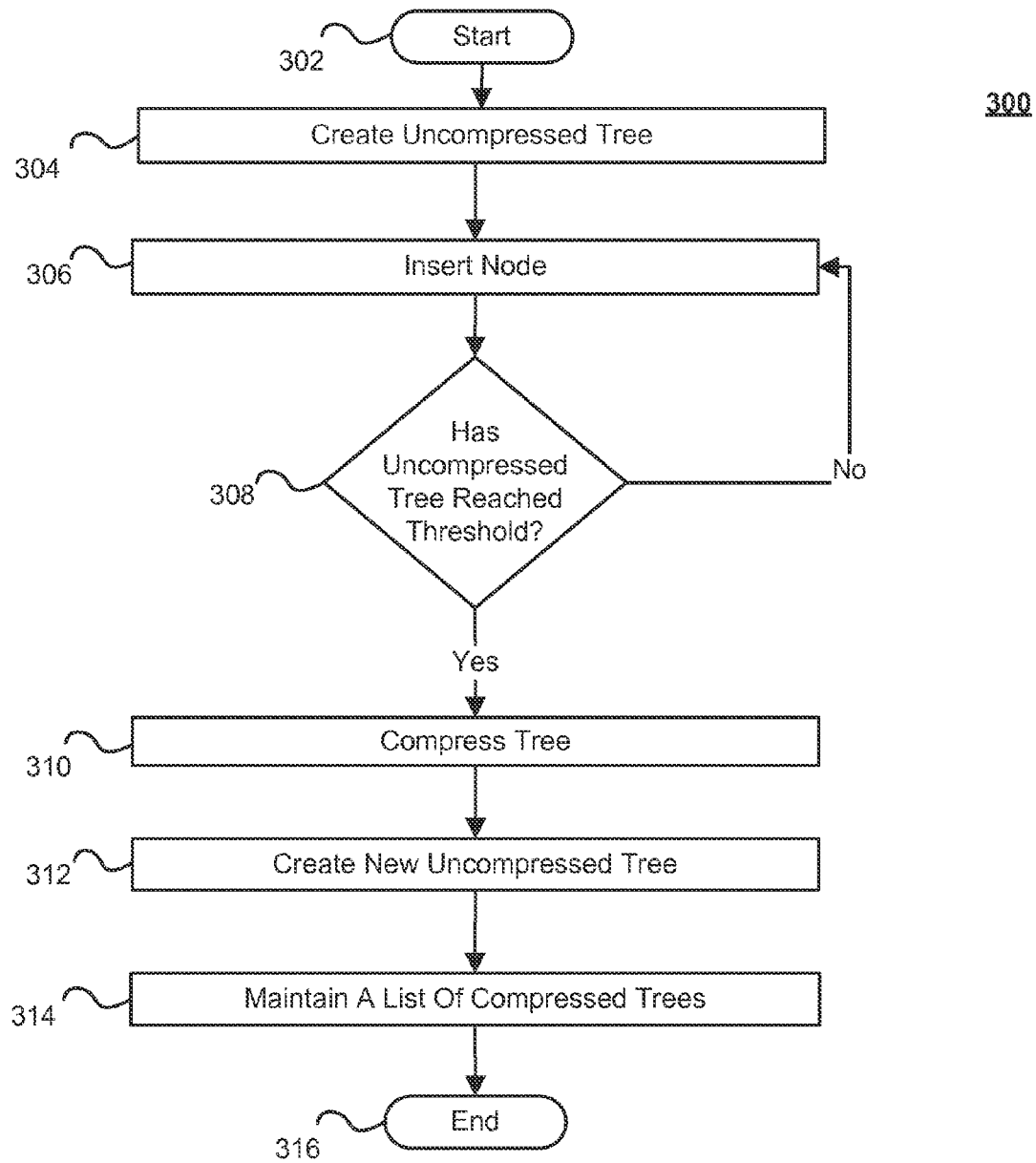
FIG. 3 depicts a flowchart illustrating key-values stores during tree creation, in accordance with an embodiment of the present disclosure.

FIG. 3 depicts a flowchart illustrating key-values stores during tree creation, in accordance with an embodiment of the present disclosure. The process 300, however, is exemplary. The process 300 can be altered, e.g., by having stages added, changed, removed, or rearranged. One or more of the stages may be implemented on host 10 and/or cache device 60 of FIG. 1. One or more stages may be implemented as modules as described in reference to FIG. 2 above. The method 300 may begin at stage 302.

At stage 304, an uncompressed tree of key-value pairs may be created. In accordance with one or more embodiments, the trees used to hold key-value pairs may comprise prefix trees, tries, and/or an ordered tree data structure.

At stage 306, a node may be inserted into the uncompressed key-value tree. The node may hold up a specified amount of data. According to some embodiments, in an uncompressed tree a key may be approximately 10 bytes and a node (including the key) may be approximately 20 bytes. A size of a key and/or a node may depend upon an amount of memory, electronic storage, an expected tree size, an expected number of trees, or other factors. A node size and/or key size of a compressed tree may be significantly smaller.

The size or other characteristics of an uncompressed tree may be monitored at stage 308. If the size of an uncompressed tree meets and/or exceeds a specified threshold the method 300 may continue at stage 310. If the size of an uncompressed tree is less than a specified threshold the method 300 may return to insert another node at stage 306 or may end at stage 316 (not shown).

At stage 310, the uncompressed tree may be compressed. Compression of an uncompressed tree may occur in response to one or more factors. For example, an uncompressed tree may be compressed based on a percentage of used space in a uncompressed tree, a number of keys in a uncompressed tree, an amount of storage used by an uncompressed tree, a percentage of storage used by an uncompressed tree, an amount of memory used by an uncompressed tree, a percentage of memory used by an uncompressed tree, a percentage of cache used by an uncompressed tree, an amount of cache used by an uncompressed tree, a key retrieval performance metric, a key insertion performance metric, a key deletion performance metric, a range query performance metric, a current load on a processor, a current I/O load on a cache, a current disk I/O load, a current network I/O load, or other metrics specified by a user.

At stage 312, a new uncompressed tree may be created. According to some embodiments, uncompressed trees may be used to handle insert requests of new keys. When an uncompressed tree reaches a specified size, it may be compressed as discussed above in reference to stage 310. An uncompressed tree and one or more compressed trees may be associated by a data structure such as a linked list.

At stage 314, a list or other data structure of one or more data trees may be maintained. For example, a linked list may refer to a plurality of data trees. A first item in a linked list may be a reference to an uncompressed tree. Other items in the linked list may include one or more references to compressed trees. References to trees in a list may be inserted as trees are created. References to trees may be reordered according to one or more factors. For example, metrics may be maintained of trees containing the most frequently requested key-value pairs, least frequently requested key-value pairs, most frequently updated key-value pairs, trees having a highest percentage of deleted keys, trees having a lowest percentage of deleted keys, or other factors. A tree having produced a higher number of hits or higher percentage of hits to misses than another tree may be listed earlier in a list or data structure, which may cause it to be traversed earlier in a search for a key.

At stage 316, the method 300 may end.

Figure 4:
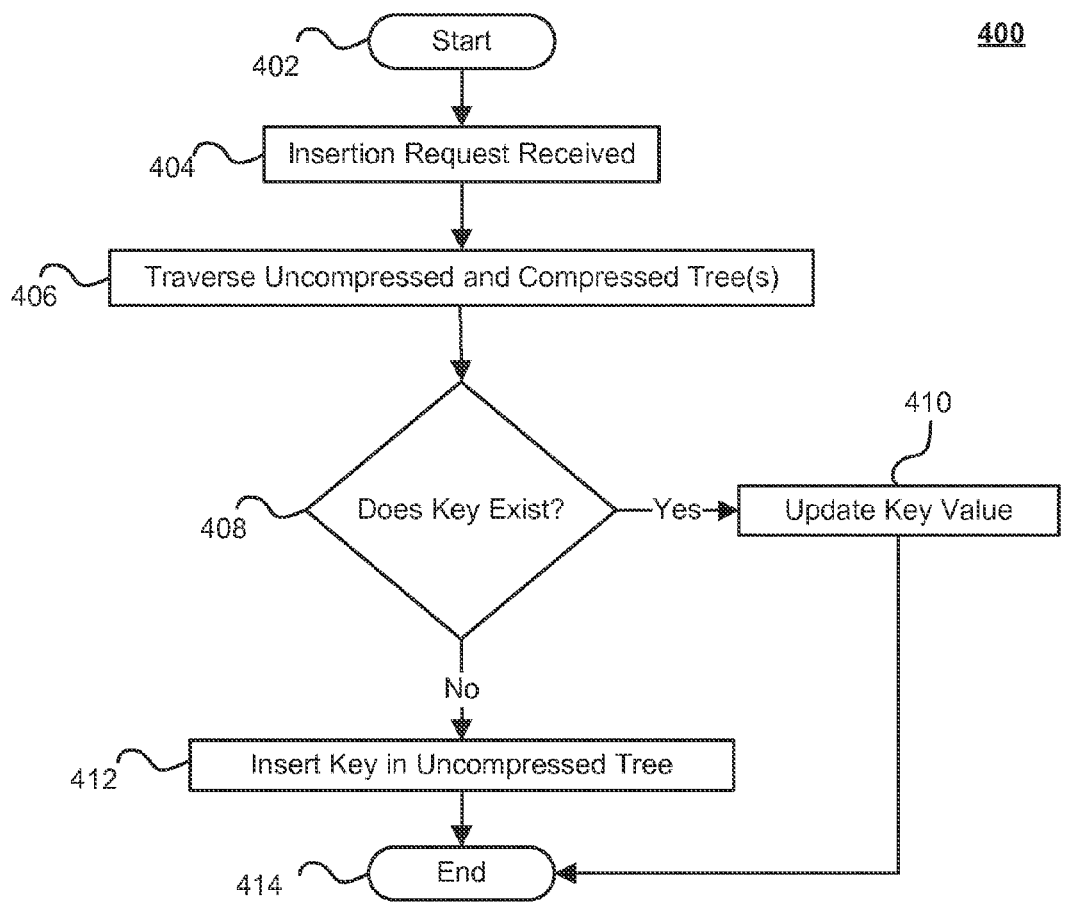
FIG. 4 depicts a flowchart illustrating key-value stores during key insertion, in accordance with an embodiment of the present disclosure.

FIG. 4 depicts a flowchart illustrating key-value stores during key insertion, in accordance with an embodiment of the present disclosure. The process 400, however, is exemplary only. The process 400 can be altered, e.g., by having stages added, changed, removed, or rearranged. One or more of the stages may be implemented on host 10 and/or cache device 60 of FIG. 1. One or more stages may be implemented as modules as described in reference to FIG. 2 above. The method 400 may begin at stage 402

At stage 404, a request to insert a key-value pair may be received. An uncompressed tree and one or more compressed trees may be traversed at stage 406 (e.g., via using a list of trees containing root node offsets).

A determination of whether a key has been found may be made at stage 408. If a key has been found, the method 400 may continue at stage 410 where the existing key may be updated with a new received value. If a key has not been found, the method 400 may continue at stage 412 where a new key-value pair may be inserted in an uncompressed tree.

At stage 414, the method 400 may end.

Figure 5:
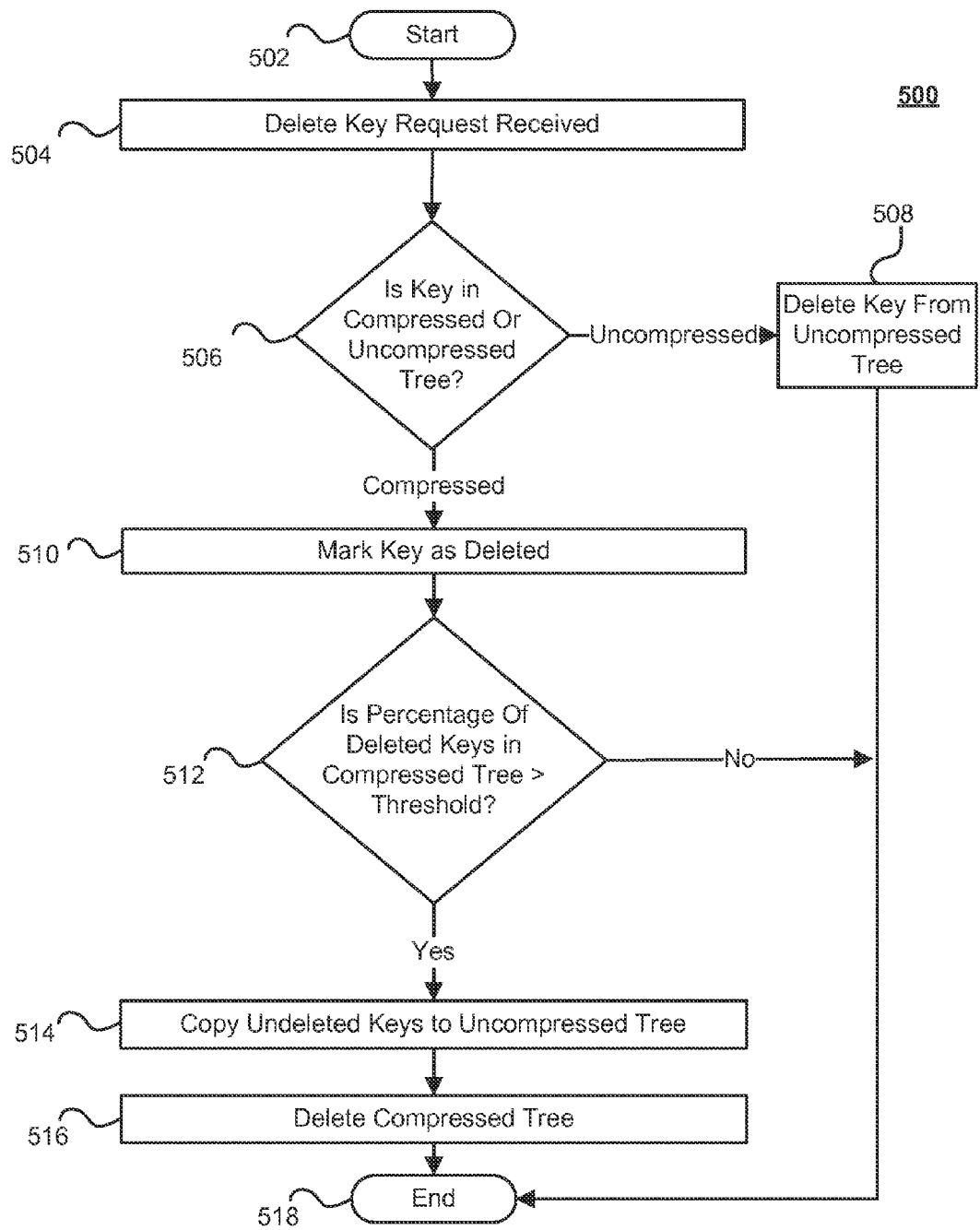
FIG. 5 depicts a flowchart illustrating reclamation of key-value storage, in accordance with an embodiment of the present disclosure.

FIG. 5 depicts a flowchart illustrating reclamation of key-value storage, in accordance with an embodiment of the present disclosure. The process 500, however, is exemplary. The process 500 can be altered, e.g., by having stages added, changed, removed, or rearranged. One or more of the stages may be implemented on host 10 and/or cache device 60 of FIG. 1. One or more stages may be implemented as modules as described in reference to FIG. 2 above. The method 500 may begin at stage 502.

A request for deletion of a key-value pair may be received at stage 504.

At stage 506, it may be determined whether a key corresponding to the delete request is in an uncompressed or a compressed tree. If a key corresponding to the delete request is in an uncompressed tree, the method 500 may delete the key-value pair at stage 508. If a key corresponding to the delete request is in a compressed tree, the method 500 may continue at stage 510.

A request for deletion of a key in a compressed tree may result in the corresponding key-value pair being marked as deleted (e.g., the value may be set to an indicator such as, for example, −1) at stage 510. Deletion of a key in a compressed tree may require reorganization of the tree so the key may be maintained but indicated as deleted. In response to the deletion request or in response to other factors, a percentage of deleted keys in a compressed tree may be compared against a specified threshold at stage 512. An amount, a percentage, or another measure of deleted keys in a compressed tree may be measured. According to some embodiments, the threshold level may be dynamically adjusted based on one or more factors. If a percentage of a compressed tree used by deleted keys meets or exceeds a specified threshold, reclamation of the space holding the deleted keys may be performed. Key-value pairs which have not been deleted but which are in a compressed may be copied to an uncompressed tree at stage 514.

After copying all keys which have not been deleted to an uncompressed tree, the compressed tree may then be deleted at stage 516. At stage 518 the method 500 may end.

Reclamation of unused space and deletion of keys may be initiated by one or more events. A delete request may trigger an evaluation of space allocated to deleted keys in a particular tree, an evaluation of available storage, an evaluation of an amount of tree and/or key-value data loaded into memory, an evaluation of available memory, an evaluation of available cache space, a comparison of a current processing and/or cache load versus an estimated reclamation time or load, and/or an evaluation of one or more performance metrics. Deletion and/or reclamation of space may also be performed at other times (e.g., periodic intervals such as nightly or during off-peak hours, or in response to an administrator command).

Figure 6:
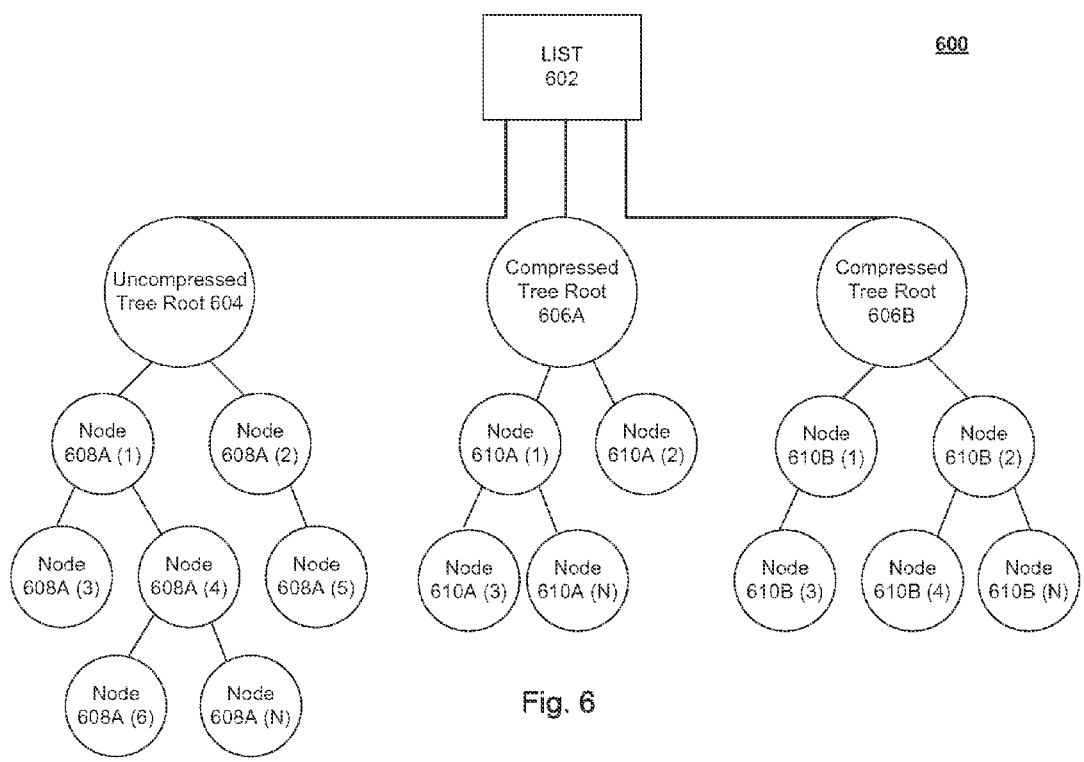
FIG. 6 shows an exemplary diagram of a plurality of key-value stores, in accordance with an embodiment of the present disclosure.

FIG. 6 shows an exemplary diagram of a plurality of key-value stores, in accordance with an embodiment of the present disclosure. List 602 may be a linked list, an ordered list, or another data structure for organizing a plurality of trees of key-value pairs. Trees may be referenced by an offset of a root node of a tree. The offset may indicate a file, cache, or other storage location for a root node of a tree. As depicted in exemplary diagram 600, list 602 may reference one or more tree root nodes such as, for example, uncompressed tree root node 604, compressed tree root node 606A, and compressed tree root node 606B. Each root node of a tree may reference one or more secondary brand or leaf nodes. Nodes of uncompressed tree root node 604 including nodes 608A(1) . . . 608A(N) may be larger and may contain larger values than nodes of compressed tree root node 606A and compressed tree root node 606B. The number of nodes is exemplary and may change due to insertions, deletions, reclamation of space used by deleted nodes and other factors. List 602 may reference a plurality of trees of key-value pairs and trees of key-value pairs may be located in separate storage. For example, List 602 may be maintained in DRAM on Host 10 of FIG. 1. The uncompressed tree beginning at root 604 may be on a first SSD associated with Host 10. The compressed tree beginning at node 606A may be on a second SSD associated with Host 10. The compressed tree beginning with node 606B may be on a disk associated with Host 10, a third SSD associated with Host 10, or other electronic storage associated with Host 10.

According to some embodiments, a number of compressed nodes 610A(1) . . . 610A(N) and 610B(1) . . . 610B(N) may be fewer in number than a number of nodes in an uncompressed tree. However, a larger number of compressed trees may be utilized. A number of nodes and trees of each type may depend on many factors including, but not limited to, available cache space, available DRAM, a number of key-value pairs, a user specified preference, key retrieval performance metrics, and key insertion performance metrics.

As described above, uncompressed nodes may be converted to compressed nodes (e.g., in a new compressed tree of key-value pairs) in response to one or more metrics. Metrics initiating a conversion of uncompressed nodes to compressed nodes may include a memory usage threshold, a storage space usage threshold, a number of keys in a tree, and one or more performance metrics.

Additionally, as discussed above, in one or more embodiments, compressed nodes may be converted to uncompressed nodes. For example, if a number of keys marked as deleted in compressed tree 606A or 606B meets a specified threshold, then the keys which have not been deleted may be migrated to an uncompressed tree. Once undeleted keys for a compressed tree have been migrated to an uncompressed tree, the compressed tree may be deleted.

Other embodiments are within the scope and spirit of the invention. For example, the functionality described above can be implemented using software, hardware, firmware, hardwiring, or combinations of any of these. One or more computer processors operating in accordance with instructions may implement the functions associated with managing key-value stores in accordance with the present disclosure as described above. If such is the case, it is within the scope of the present disclosure that such instructions may be stored on one or more non-transitory processor readable storage media (e.g., a magnetic disk or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for improving key-value stores in electronic storage comprising:
creating an uncompressed tree of key-value pairs;
monitoring, using a computer processor, growth of the uncompressed tree;
compressing the uncompressed tree when the uncompressed tree meets a specified threshold; and
creating a new empty uncompressed tree.

2. The method of claim 1, wherein the threshold comprises at least one of: a percentage of used space in a uncompressed tree, a number of keys in a uncompressed tree, an amount of storage used by an uncompressed tree, a percentage of storage used by an uncompressed tree, a percentage of memory used by an uncompressed tree, an amount of memory used by an uncompressed tree, a percentage of cache used by an uncompressed tree, an amount of cache used by a uncompressed tree, a key retrieval performance metric, a key insertion performance metric, a key deletion performance metric, a range query performance metric, a current load on a processor, a current I/O load on a cache, a current disk I/O load, a current network I/O load, and a user specified metric.

3. The method of claim 1, further comprising:
maintaining a list of an uncompressed tree and one or more compressed trees; and
searching one or more trees in the list to identify a key.

4. The method of claim 1, further comprising:
receiving a request to insert new key-value data;
searching one or more key-value trees;
determining whether a key corresponding to the new key-value data exists in a tree;
in the event that the key is identified in a tree, updating data associated with the key with the new key-value data; and
in the event that the key is not identified in a tree, inserting a new key-value pair in the uncompressed tree.

5. The method of claim 1, further comprising:
receiving a request to delete a key-value pair from a tree;
determining whether the requested key-value pair is in uncompressed tree or a compressed tree;
in the event the requested key-value pair is in an uncompressed tree, deleting the requested key-value pair; and
in the event the requested key-value pair is in a compressed tree, marking the requested key-value pair for deletion.

6. The method of claim 5, further comprising:
determining that an amount of deleted key-value pairs in a tree having at least one deleted key-value pair meets a specified threshold; and
reclaiming space used by the deleted key-value pairs.

7. The method of claim 6, wherein reclaiming space used by the deleted key-value pairs comprises:
copying a key-value pair which has not been deleted from the tree having at least one deleted key-value pair to the uncompressed tree; and
deleting the tree having at least one deleted key-value pair.

8. The method of claim 6, wherein the threshold comprises at least one of: a percentage of unused space in a compressed tree, a number of deleted keys in a compressed tree, an amount of storage used by an compressed tree, a percentage of storage used by an compressed tree, a percentage of memory used by a compressed tree, an amount of memory used by a compressed tree, a percentage of cache used by a compressed tree, an amount of cache used by a compressed tree, a key retrieval performance metric, a key deletion performance metric, a range query performance metric, a current load on a processor, a current network I/O load, a current cache I/O load, a current disk I/O load, and a user specified metric.

9. The method of claim 6, wherein reclaiming space used by the deleted key-value pairs is scheduled based on at least one of: an off-peak time, a comparison of a current processing load versus an estimated reclamation load, a comparison of a current I/O load versus an estimated reclamation load, and a user command.

10. The method of claim 1, further comprising:
receiving first key indicating an upper range boundary of a range query and a second key indicating an lower range boundary of the range query; and
traversing one or more trees to return key-values within the boundaries of the range query.

11. The method of claim 1, further comprising:
maintaining a data structure containing a reference to the uncompressed tree and a reference to at least one compressed tree.

12. The method of claim 11, wherein the reference comprises a linked list.

13. The method of claim 11, wherein the data structure contains references to trees which are ordered based on a specified metric.

14. The method of claim 13, wherein the specified metric comprises at least one of: trees having most frequently requested key-value pairs, trees having least frequently requested key-value pairs, trees having most frequently updated key-value pairs, trees having a highest percentage of deleted keys, trees having a lowest percentage of deleted keys, or a user specified metric.

15. The method of claim 11, wherein the data structure is maintained in memory of a host device and references trees maintained on a cache device associated with the host device.

16. The method of claim 11, wherein the reference comprises an offset indicating a location of the tree in storage.

17. An article of manufacture for improving key-value stores in electronic storage, the article of manufacture comprising:
at least one non-transitory processor readable storage medium; and
instructions stored on the at least one medium;
wherein the instructions are configured to be readable from the at least one medium by at least one processor and thereby cause the at least one processor to operate so as to:
create an uncompressed tree of key-value pairs;
monitor growth of the uncompressed tree;
compress the uncompressed tree when the uncompressed tree meets a specified threshold; and
create a new empty uncompressed tree.

18. The article of manufacture of claim 17, wherein the instructions are further configured to execute and thereby cause the at least one processor to operate so as to:
maintain a list of an uncompressed tree and one or more compressed trees; and
search one or more trees in the list to identify a key.

19. The article of manufacture of claim 17, wherein the instructions are further configured to execute and thereby cause the at least one processor to operate so as to:
receive a request to insert new key-value data;
search one or more key-value trees;
determine whether a key corresponding to the new key-value data exists in a tree;
in the event that the key is identified in a tree, update data associated with the key with the new key-value data; and
in the event that the key is not identified in a tree, insert a new key-value pair in the uncompressed tree.

20. The article of manufacture of claim 17, wherein the instructions are further configured to execute and thereby cause the at least one processor to operate so as to:
receive a request to delete a key-value pair from a tree;
determine whether the requested key-value pair is in uncompressed tree or a compressed tree;
in the event the requested key-value pair is in an uncompressed tree, delete the requested key-value pair; and
in the event the requested key-value pair is in a compressed tree, mark the requested key-value pair for deletion.

* * * * *